March 19, 1957 R. A. GRAHAM 2,785,623
APPARATUS FOR HEATING FOOD IN CLOSED CONTAINERS
Filed April 23, 1954 3 Sheets-Sheet 1
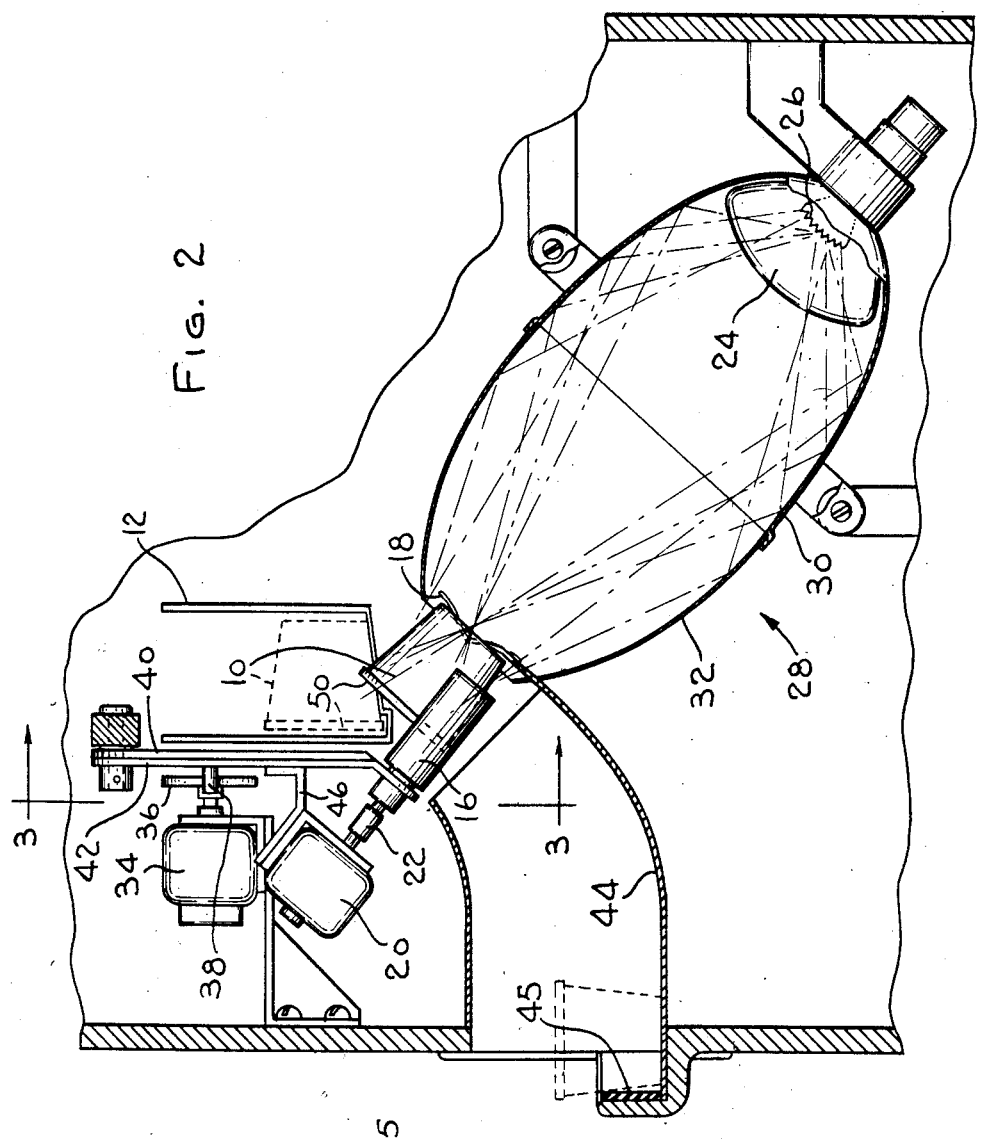
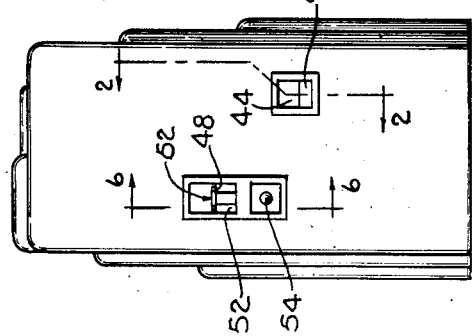
*INVENTOR.*
RICHARD A. GRAHAM
BY
John W. Michael
ATTORNEY March 19, 1957 R. A. GRAHAM 2,785,623
APPARATUS FOR HEATING FOOD IN CLOSED CONTAINERS
Filed April 23, 1954 3 Sheets-Sheet 2
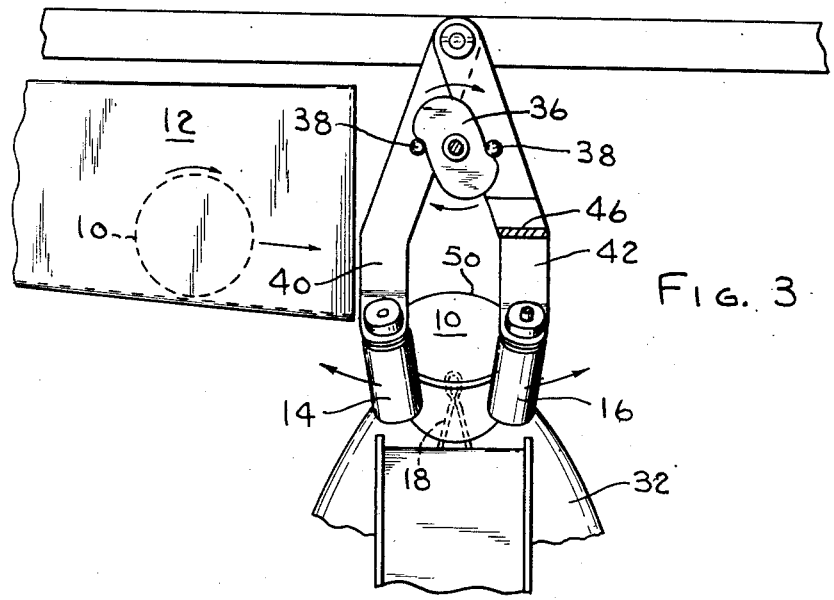
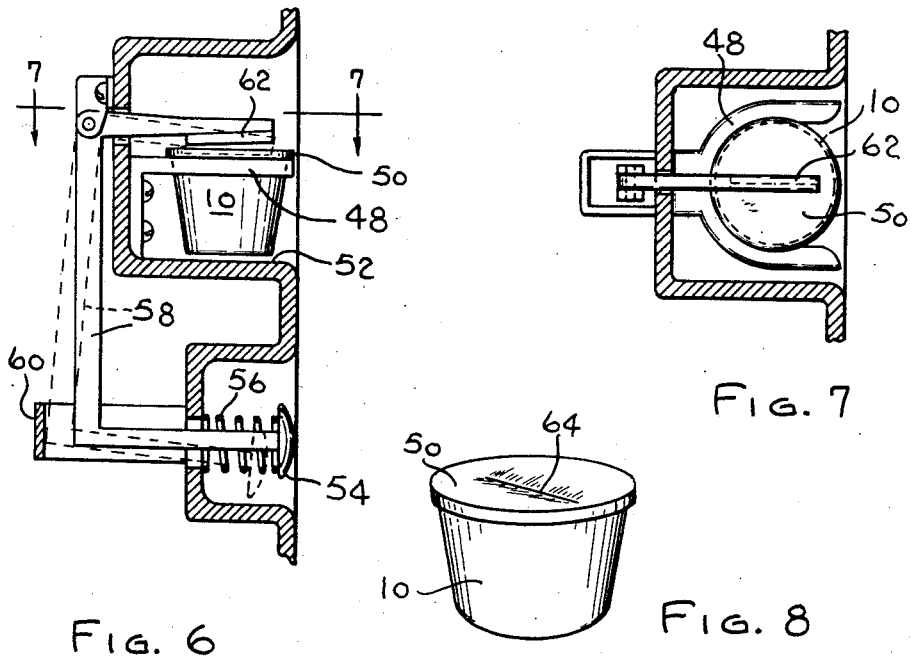
INVENTOR.
RICHARD A. GRAHAM
BY
ATTORNEY March 19, 1957 R. A. GRAHAM 2,785,623
APPARATUS FOR HEATING FOOD IN CLOSED CONTAINERS
Filed April 23, 1954 3 Sheets-Sheet 3
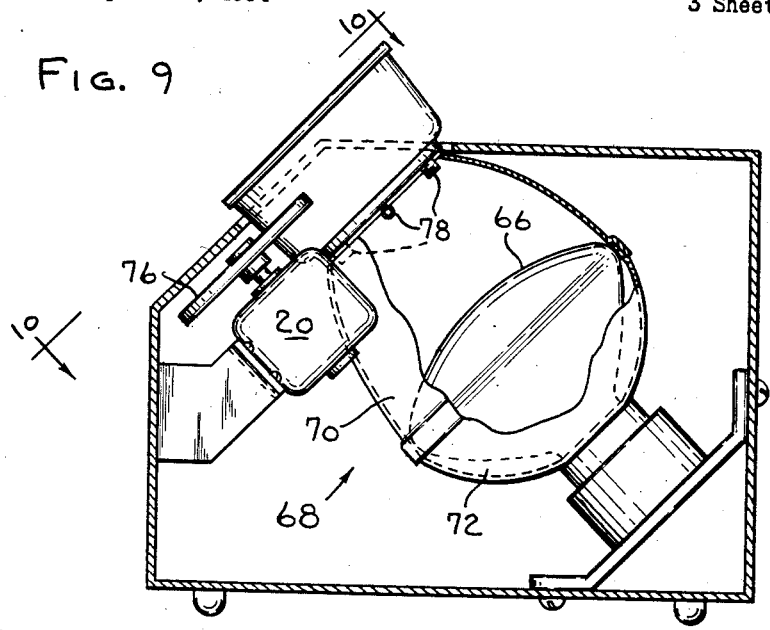
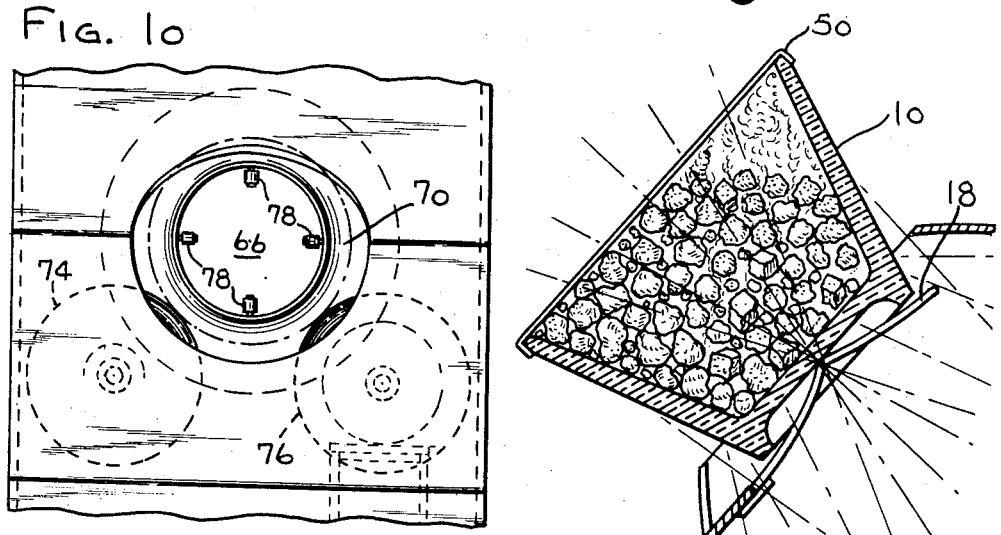
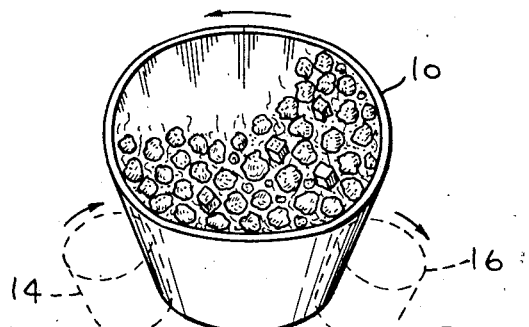
INVENTOR.
RICHARD A. GRAHAM
BY
ATTORNEY

United States Patent Office 2,785,623
Patented Mar. 19, 1957

2,785,623

APPARATUS FOR HEATING FOOD IN CLOSED CONTAINERS

Richard A. Graham, Thiensville, Wis.

Application April 23, 1954, Serial No. 425,111

4 Claims. (Cl. 99—357)

This invention relates to a method of an apparatus for heating food in containers. More specifically, this invention relates to a method and apparatus for heating food in sealed containers by means of infra-red radiation. The invention is applicable to vending machines and counter and home units. This application is a continuation-in-part of my application Serial No. 404,946, filed January 19, 1954, for "Hot Food Vending Machine."

The principal object of this invention is to provide a fast, efficient, sanitary method and apparatus for heating food in glass or metal containers.

Another object is to provide a method and apparatus for rapidly heating food in a container while insuring even heating of all the food.

Still another object is to provide means for heating food in a container while keeping the temperature of at least a portion of the wall of the container low enough to permit handling the container immediately after the heating cycle is finished.

A further object is to provide simple apparatus for removing the lid from a vacuum packed jar.

Other objects and advantages will be pointed out in, or be apparent from, the specification and claims, as will obvious modifications of the two embodiments shown in the drawings, in which:

Fig. 1 is a front elevation of a vending machine provided with heating apparatus according to this invention and the lid-removing mechanism shown in Figs. 6 and 7;

Fig. 2 is a vertical section taken on line 2—2 of Fig. 1 showing a sealed glass jar in the heating position;

Fig. 3 is a view taken as indicated by line 3—3 on Fig. 2 and illustrates the jar release mechanism;

Fig. 4 is an enlarged sectional view showing the manner in which heat is focused on the bottom of the jar to achieve rapid heating of the jar contents;

Fig. 5 is another view of the jar in the heating position;

Fig. 6 is a vertical section showing the lid removing apparatus;

Fig. 7 is a top view of the lid removing apparatus taken as indicated by line 7—7 on Fig. 6;

Fig. 8 is a perspective view showing the manner in which the apparatus shown in Figs. 6 and 7 creases the top of the container to permit easy removal of the top;

Fig. 9 illustrates a counter or home-type heating mechanism similar to the mechanism shown in Figs. 2 and 3 but employing a modified reflector arrangement;

Fig. 10 is a view taken as indicated by line 10—10 on Fig. 9.

The essential features of this invention are rather simple. I provide apparatus for concentrating infra-red radiation from an infra-red bulb on the bottom of a vacuum packed can or glass jar containing a food which is partly fluid and rotating on an inclined axis. Before discussing the structures shown in the drawings it is best to understand the heating process in general. When the food is vacuum packed an air space or void is left in the jar in order to secure a tumbling action when the can or jar is rotated and thus facilitate mixing the contents and secure even heating thereof. A glass container readily passes infra-red radiation and the rays penetrate the food about one inch. Since the jar is vacuum packed, the contents boil at a low temperature causing steam bubbles to rise through the jar. The tumbling causes the bubbles to break up and spread throughout the jar to give up heat uniformly through the food. The tumbling also insures rapid condensation of the bubbles which avoids pressure build-up sufficient to loosen the jar lid. The rotation of the jar during heating is also important in that the wiping action on the bottom increases the heat transfer and avoids hot spots due to overly concentrated infra-red radiation.

When a vacuum-packed can is employed the bottom surfaces are blackened to accept radiation. The can, which may be in the form of a frustum of a right circular cone or may be cylindrical with its diameter preferably about twice its height, is rotated on an inclined axis just as in the case of the jar. This promotes uniform heating of the contents and prevents hot spots damaging the enameled or otherwise coated interior of the can. It will be appreciated that the can and jar are approximate equivalents in this process and for this reason most of the following description will be limited to discussion of the use of a jar as illustrated in the drawings.

The reflector is basically an ellipsoid of revolution to concentrate the rays emitted from the bulb filament, located at one focus, on the bottom of the jar or can located at the other focus. While most of the radiation desirably passes through the bottom of the jar to heat the food some radiation desirably passes into the wall of the jar to avoid stresses set up when only the bottom is heated. In the interest of rapid heating I use high power infra-red bulbs having between 2000 and 2400 watt output (smaller wattage being used in home units, of course,) which will heat one-half pound of food from 100° F. to 150° F. in about thirty seconds. It will be noted that 100° F. is the starting temperature. At this temperature vacuum packed food will not suffer adverse effects from storage and will be more fluid to aid the tumbling action. Maintaining a 100° F. ambient temperature in the vending machine by means of a separate thermostatically controlled heater reduces the required temperature rise with a corresponding reduction in the heating time. The heating time is substantially constant for different foods since the specific heats of fluid foods are substantially the same. Employing a constant ambient has, therefore, an additional advantage in that a simple constant-time control can be used rather than more costly controls which would be necessary if the ambient temperature was variable.

A further advantage of maintaining a high ambient temperature resides in the increased fluidity of the food in the container due to the fats becoming more liquid. In connection with the storage of the food it may be noted that storing of the containers upside down or at least on edge prevents compacting the food in the bottom of the container in such a manner as would impair the tumbling action.

The food is preferably heated to 150° which represents some overheating (about 10° F.). The excess heat dissipates into large pieces in the food in the time it takes to open the jar, thus insuring proper temperature of all the food. The jar bottom gets quite hot and this feature keeps the last-eaten portion hot as heat transfers from the jar bottom to the food.

The drawings relating to the vending machine arrangement do not show the various controls, control circuits, supply chutes and the like since such structure may be of any conventional design modified only to handle the jars. When the selection mechanism is actuated a jar 10 of the selected food is dropped into the feed chute 12 which is inclined to roll the jar to the right (Fig. 3). The jaw drops off the feed chute to rest on idler roller 14, drive roller 16, and support 18 in an inclined position (Fig. 2). The controls now energize motor 20 which drives roller 16 through flexible coupling 22 at the proper speed to obtain the tumbling action. If the speed is too slow there will be insufficient tumbling and if too fast a vortex action occurs and prevents tumbling. Simultaneously with the motor energization the infra-red bulb 24 is turned on. The infra-red radiation is emitted from filament 26 and focused on the bottom of jar 10 by the ellipsoidal reflector 28 made up of mating half-sections 30, 32. The interior surface of the reflector is preferably gold plated to prevent tarnishing and consequent loss of efficiency. The center of the filament 26 and the center of the jar bottom are located at the foci of the ellipse. Since the filament is not a point source the entire bottom of the jar is exposed to radiation. The radiation passes through the glass and will also pass up the side of the jar to heat the side wall and prevent cracking. The food is heated as described above.

Upon completion of the heating cycle (about thirty seconds) motor 20 and the bulb are de-energized and motor 34 is energized for one-half revolution to turn cam 36 one-half revolution which spreads followers 38, 38 and pivoted roller support arms 40, 42. This releases jar 10 which slides down delivery chute 44 to the delivery position against rubber stop 45. The jar could be rolled down the chute to obtain further mixing, if desired. It will be noted that drive motor 20 is mounted on bracket 46 welded on roller arm 42. The delivered jar of food is at 150° F. which is quite hot. Accordingly, it is suggested that a paper wrapper in the form of an enclosing label be fixed on the jars to insure ease of handling.

The customer takes the jar from the delivery chute and places it into the U-shaped bracket 48 (Figs. 6 and 7) which fits under the lid 50 and holds the jar slightly above platform 52. Plunger 54 is now pushed in against the bias of spring 56 to move pivoted crank 58 counter-clockwise until it strikes stop 60. This action drives an anvil 62 into the lid to crease and indent the lid as shown at 64 in Fig. 8. The anvil is shown wedge-shaped but can have other shapes. The stop 60 is positioned to prevent pushing anvil 62 far enough to remove the lid or damage the glass. Removal is not desired since the contents could then be spilled, creating a health hazard. Instead, the vacuum is broken and the lid merely loosened for easy removal with the thumbs, a key, coin, or the like. This avoids any chance of contamination of the vending machine.

In the case of food packed in cans, the can may be of the tear-strip type to allow easy, sanitary removal of the lid. The can too may be provided with a paper label to facilitate handling of the hot can.

While difficult to portray in a drawing, Figs. 4 and 5 give some idea of the tumbling action which occurs when the jar is rotated. In Fig. 4 it will be noted that the bottom of the jar is recessed slightly. This increases the heat absorption through the bottom. The side wall slopes at an angle which reflects the radiation which has passed through the bottom and some food. The degree of slope can be varied to increase the absorption of radiation by the glass wall if insufficient wall heating is obtained. The metal lid will reflect radiation if the angle of incidence is correct. While of no importance to the invention, the jar may be shaped as a "double old-fashioned" glass suitable for home use (the jar would have fluting in the side wall in this case of aesthetic appeal). Such a design has an advantage in that the customer most likely will take the empty jar with him, thus lessening the removal problem of the machine operator.

In the home or counter model illustrated in Figs. 9 and 10 a smaller wattage bulb is used (probably about 1000 watts) which avoids the need for special wiring required by the commercial model. The illustrated bulb 66 is clear and is housed in a reflector 68 comprised of a generally semi-ellipsoid of revolution section 70 and a generally semi-paraboloid of revolution section 72. This arrangement results in a considerable compaction of the reflector design while retaining rather good efficiency. The reflector can, if desired, take the form of a paraboloid for further compaction of design (with further loss of efficiency). The starting temperature with the home or counter unit is usually about 70° which requires a longer heating cycle to compensate for the increased required temperature rise.

In Figs. 9 and 10 a bowl type jar is shown resting on idler roller 74, drive roller 76, and four rollers 78 upon which the bottom rides. Motor 80 drives roller 76 and is controlled by a timer (not shown) which also controls the bulb circuit. The lid may be removed by a separate loosener such as shown in Figs. 6 and 7, or by any other means.

It should be noted that infra-red bulbs having built-in reflectors can be used in conjunction with a mating reflector element for focusing the radiation on the bottom of the jar. The built-in reflector is advantageous when it is desired to hold the cost and space requirements to a minimum. In the interest of saving space the reflector between the bulb and the jar can be made on the Fresnel lens principle. In this case the "stepped" reflector is quite efficient and is most satisfactory from the required space standpoint.

As mentioned above it is important that the jar or can be rotated during heating. The reason for this is that the rotation promotes tumbling of the contents which in turn breaks up the vapor bubbles generated by the heat in the evacuated container. As the bubbles break up various paths are followed which permit the hot gases to give up their heat evenly throughout the contents while insuring against building up sufficient internal pressure to remove the lid. Thus the tumbling is very important. In order to secure tumbling it is important that the contents be rather fluid and that the head space or void be large enough to allow the tumbling. Fluidity of the food is obtained both by the initial selection of the food and by maintaining the 100° F. ambient temperature which softens or liquefies the fats in the food markedly over room or normal ambient conditions. The headspace should be at least about one-eighth of the container volume in order to allow enough tumbling.

If the above conditions are met the present apparatus heats food in jars most successfully. It is again to be noted that the sides of the jars should receive some radiation to avoid heat stresses in the jar which would break the jar. In this connection it is to be noted that maintaining an ambient temperature of 100° F. reduces this hazard. The rotation which promotes tumbling and therefore prevents pressure build-up to blow the lid off the jar also prevents local hot spots which could break the jar.

Although my tests to date indicate that the hot glass jar delivered from the vending machine may be placed on a conductive (metal) surface without cracking the jar due to stresses set up by rapid local cooling it may be advisable to insure against the possibility in practice. This can be done by providing a separate dispenser for cup-like paper or cardboard insulators adapted to receive the jar after it has been delivered from the machine. Thus the customer places the hot jar in the insulator after lifting it from the delivery chute. The insulator also facilitates handling of the hot jar and keeps the contents hot longer.

Although but two embodiments of the present invention have been illustrated and described it will be apparent to those skilled in the art that various other changes and modifications may be made therein without departing from the spirit of the invention or from the scope of the appended claims.

I claim:

1. Apparatus for heating food in a container, comprising, means for positioning the container on an inclined axis and including means for rotating the container about said axis, an infra-red bulb having a filament and acting as a source of infra-red radiation, a generally ellipsoidal reflector for focusing the radiation on the bottom of the container, said filament being located at one focus of the reflector and the bottom of said container being located at the other focus of the reflector.

2. Apparatus for heating food comprising, means including an idler roller and a drive roller for positioning the container on an inclined axis, a filament source of infra-red comprising, a reflector substantially enclosing said filament source and the bottom of said container, the filament source being located at a focal point of the reflector and the bottom of the container being located at another focal point of the reflector so the rays emitted from said source are focused on the bottom of said container, and means for driving said drive roller to rotate the container about said axis.

3. A delivery chute mounted adjacent the apparatus defined in claim 2 with its receiving end located to receive said container, and means for moving said rollers from the position in which they serve to position the container to an inoperative position in which the container is released for gravitational movement into the receiving end of the delivery chute.

4. Apparatus according to claim 2 in which the reflector is substantially an ellipsoid of revolution.

References Cited in the file of this patent

UNITED STATES PATENTS

| | | |
|---|---|---|
| 1,120,758 | Stirn | Dec. 15, 1914 |
| 1,531,217 | Simmons | Mar. 31, 1925 |
| 1,981,583 | Craig | Nov. 20, 1934 |
| 2,308,601 | Gentele | Jan. 19, 1943 |
| 2,332,099 | McKinnis | Oct. 19, 1943 |
| 2,355,459 | Miskella | Aug. 8, 1944 |
| 2,517,542 | Clifcorn | Aug. 8, 1950 |
| 2,565,570 | Messinger | Aug. 28, 1951 |
| 2,575,426 | Parnell | Nov. 20, 1951 |
| 2,606,707 | Tambini et al. | Aug. 12, 1952 |
| 2,657,599 | Packer | Nov. 3, 1953 |